United States Patent [19]

Friedl et al.

[11] Patent Number: 5,273,499

[45] Date of Patent: Dec. 28, 1993

[54] CLAW COUPLING WITH LARGE ANGLE OF DEFLECTION AND SMALL RETAINING AND RELEASING FORCE

[75] Inventors: Reinhard Friedl, Salzweg; Harald Wendl, Vilshofen; Max Schuster, Passau, all of Fed. Rep. of Germany

[73] Assignee: Zahnradfabrik Friedrichshafen AG, Fed. Rep. of Germany

[21] Appl. No.: 781,260

[22] PCT Filed: Jul. 7, 1990

[86] PCT No.: PCT/EP90/01099

§ 371 Date: Dec. 19, 1991

§ 102(e) Date: Dec. 19, 1991

[87] PCT Pub. No.: WO91/01454

PCT Pub. Date: Feb. 7, 1991

[30] Foreign Application Priority Data

Jul. 14, 1989 [DE] Fed. Rep. of Germany ....... 3923217

[51] Int. Cl.$^5$ ............................................. F16H 1/44
[52] U.S. Cl. ........................................ 475/241; 192/67 R; 192/108; 475/231; 475/236; 475/237; 475/240
[58] Field of Search ............. 192/67 R, 108; 475/231, 475/236, 237, 240, 241

[56] References Cited

U.S. PATENT DOCUMENTS

| | | |
|---|---|---|
| 2,639,013 | 5/1953 | Meschia . |
| 2,887,201 | 5/1959 | Willis . |
| 3,027,781 | 4/1962 | O'Brien ........................ 475/231 |
| 3,656,598 | 4/1972 | Goble ........................ 192/67 R X |
| 4,059,026 | 11/1977 | Stritzel ........................ 192/108 X |
| 4,185,511 | 1/1980 | Blackburn et al. ........... 192/108 X |
| 4,271,722 | 7/1981 | Campbell . |
| 4,290,321 | 9/1981 | Wilson ........................ 475/240 X |
| 4,788,888 | 12/1988 | Tsutsumikoshi ............. 475/237 |
| 4,838,118 | 6/1989 | Binkley ........................ 475/231 X |
| 5,031,740 | 7/1991 | Deichstetter et al. ........ 192/67 R X |
| 5,037,362 | 8/1991 | Teraoka et al. .............. 475/231 X |
| 5,038,884 | 8/1991 | Hamada et al. ............... 192/108 X |

FOREIGN PATENT DOCUMENTS

| | | |
|---|---|---|
| 1068567 | 11/1959 | Fed. Rep. of Germany ...... 475/237 |
| 1178262 | 9/1964 | Fed. Rep. of Germany . |
| 3633514 | 4/1987 | Fed. Rep. of Germany . |
| 61-220934 | 10/1986 | Japan ........................... 475/231 |
| 1-4522 | 1/1989 | Japan ........................... 475/231 |
| 738458 | 10/1955 | United Kingdom . |

Primary Examiner—Leslie A. Braun
Assistant Examiner—David E. Henn
Attorney, Agent, or Firm—Davis, Bujold & Streck

[57] ABSTRACT

In a clutch (6) for locking a differential gear for a vehicle, a movable half (60) of the clutch (6) is pushed indirectly via a sliding sleeve (70) and intermediate members (77) in an engaging direction. Then the sliding sleeve (70), with a locking surface (74), retains the intermediate members (77) firmly in a locking position between a bearing surface (64) of the movable half (60) and an axially stationary retaining surface (4). Flanks (52, 62) of clutch teeth (51, 61) of an axially stationary half (50) and of the movable half (60) form in the axle direction a deflection angle (55). The bearing surface (64) and the retaining surface (4) form a wedge angle (65). The locking surface (74) of the sliding sleeve (70) is inclined in an axial direction forming a small releasing angle (75). To open the clutch (6), the sliding sleeve (70) is pulled away. A torque produces through the deflection angle (55) an axial deflection force which then disengages the clutch (6). The intermediate members (77) are, at the same time, pushed out of their locking position by the wedge angle (65). A small retaining force and a small releasing force on the sliding sleeve (70) are sufficient to keep engaged and to disengage the clutch (6) even against maximum torque.

9 Claims, 3 Drawing Sheets

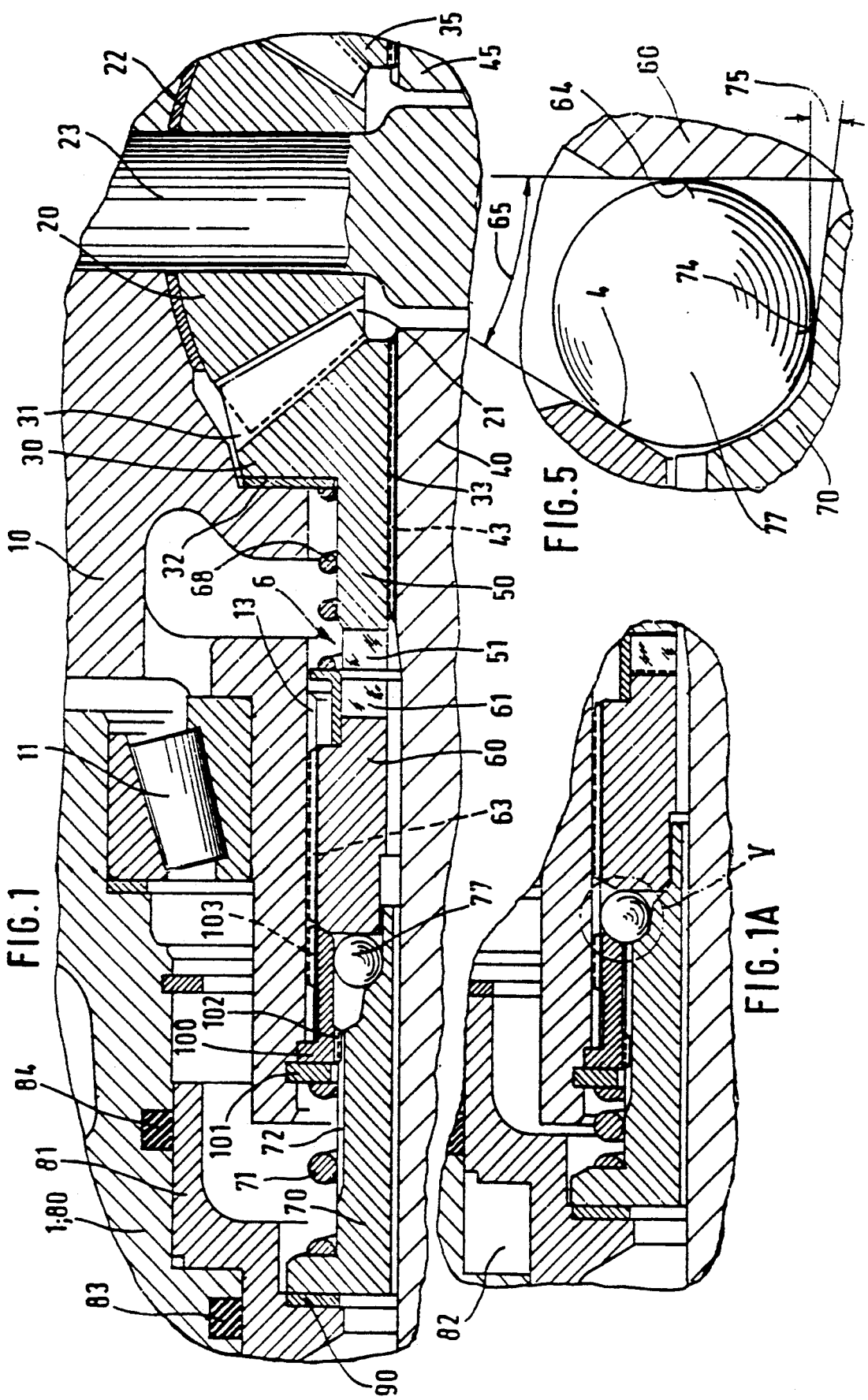

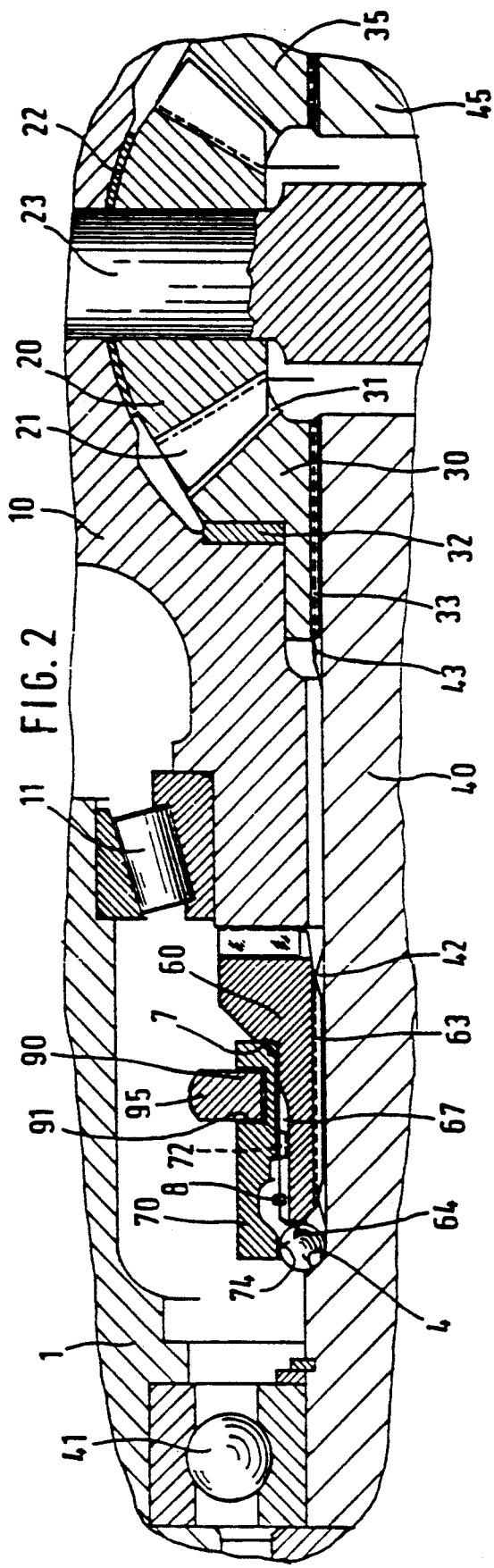
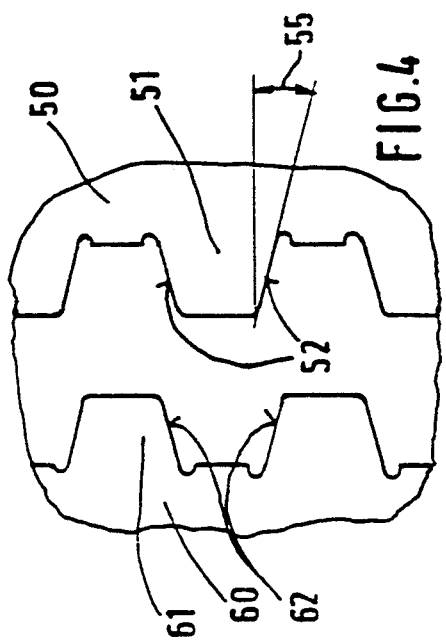
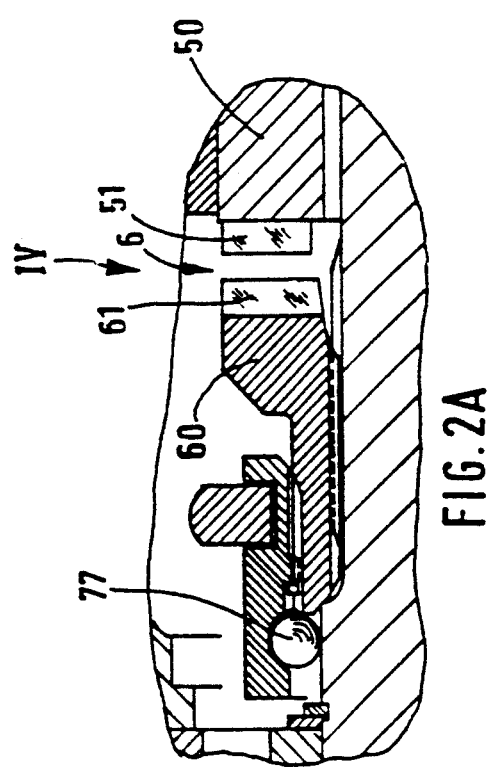

CLAW COUPLING WITH LARGE ANGLE OF DEFLECTION AND SMALL RETAINING AND RELEASING FORCE

BACKGROUND OF THE INVENTION

The invention concerns a clutch having the following features:

the clutch has an axially stationary and an axially movable half;

the halves of the clutch carry clutch teeth mating with each other;

the flanks of the clutch teeth are inclined making an angle of deflection in an axial direction.

A clutch of this kind should be capable, even in the presence of maximum torque, to keep itself reliably engaged with a small retaining force; with a small releasing force, even in the presence of torque to disengage quickly and reliably; and in the presence of small torque and low relative speed to engage quickly and reliably.

The first requirement necessitates a small or even negative deflection angle. Then, only a small or even no retaining force is necessary on the movable half in order to keep the clutch engaged, even in the presence of maximum torque.

The other two requirements lead to a large deflection angle. When the deflection angle is large enough, each torque quickly and reliably disengages the clutch automatically due to the axial deflection force of the clutch teeth and a releasing force on the movable half is unnecessary. With a large deflection angle, the clutch can be easily engaged in the presence of a small torque and small relative speed since the tooth gaps of the clutch teeth are so wide that the tooth heads always quickly and reliably find their tooth gaps.

If the deflection angle is going to be enlarged beyond the hitherto customary limit, an axial bearing is required to directly transmit the axial retaining force from an external actuation member to the movable half. The bearing poses difficulties either by its wear or by its size, since such a large deflection angle in the presence of maximum torque produces a very great deflection force causing wear in the bearing or requiring a very large bearing.

The above also applies to the already known claw coupling of DE-OS 19 30 668.

There exists a known clutch (German Patent 945 201) in which a sliding sleeve, with balls as intermediate members, pushes a movable half against a stationary half and in which one cylindrical locking surface holds the intermediate members firmly in a locking position between a bearing surface of the movable half and an axially stationary retaining face. However, the clutch is a friction multi-disc clutch in which no deflection angle can be changed and thus no compromise sought between light retention and light release of the clutch, but in which a great axial retaining force is always needed on the movable half in order to keep the clutch engaged and in which the release of the clutch always requires only a small or absolutely no releasing force.

The invention is based on the problem of providing a clutch of the kind described above which meets all three conditions mentioned.

The present invention solves the problem with intermediate members located axially between a bearing surface of the movable half and an axially stationary retaining surface. With this construction, even in the case of maximum deflection angle and maximum torque, only a small external retaining force and a small releasing force on the sliding sleeve is required. The torque automatically disengages the clutch quickly and reliably upon application of a small releasing force.

SUMMARY OF THE INVENTION

The invention discloses, possible angle ranges for the deflection angle of the clutch teeth, for the wedge angle between the bearing surface of the movable half and the axially stationary retaining surface, and for a releasing angle of the locking surface of the sliding sleeve. The torque supplies to the clutch a releasing force on the sliding sleeve via the axial deflection force of the clutch teeth and the radial force of the intermediate members and through the releasing angle of the locking surface.

The invention discloses preferred angle ranges for the three angles.

The invention discloses characteristics of a preferred embodiment where the deflection force of the clutch teeth stresses only the parts of the clutch.

The invention discloses characteristics of a differential transmission for a vehicle in which a clutch according to the invention can be used with special advantage.

The invention discloses preferred embodiments for a clutch according to the invention in a differential transmission.

BRIEF DESCRIPTION OF THE DRAWINGS

The invention will now be described, by way of example, with reference to the accompanying drawings in which:

FIG. 1 and 1A show a clutch, disengaged and engaged, respectively, according to a first embodiment of the invention;

FIG. 2 and 2A show a clutch, engaged and disengaged, respectively, according to a second embodiment of the invention;

FIG. 4 shows the clutch teeth when the clutch is disengaged; and

FIG. 5 shows a ball as an intermediate member in an engaged clutch.

DETAILED DESCRIPTION OF THE INVENTION

Figure 3:
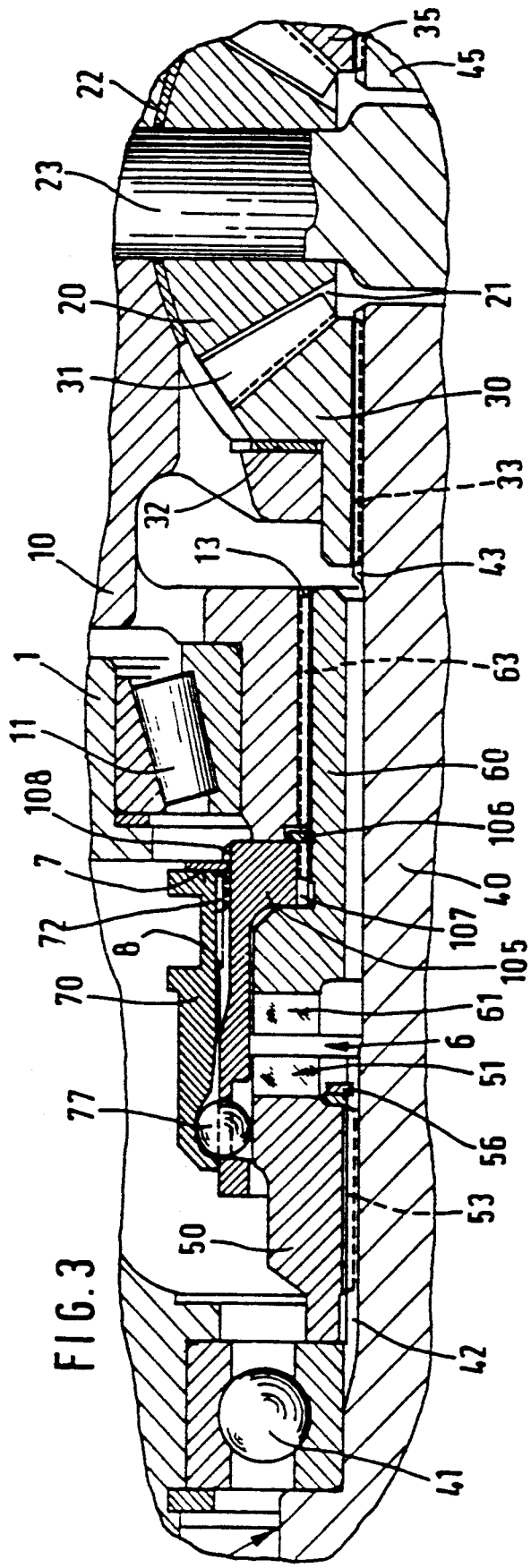
FIG. 3 and 3A show a clutch, disengaged and engaged, respectively, according to a third embodiment of the invention.

FIGS. 1 to 3: A planet carrier 10 is supported on two planet carrier bearings 11 in a housing 1. The planet carrier 10 drives, via planet gears 20, two central gears 30, 35. The planet gears 20 and the central gears 30, 35 are bevel gears with bevel teeth 21, 31. The planet gears 20 are supported radially on planet axles 23 and axially in spherical bearing shells 22 in the planet carrier 10. The central gears 30, 35 are axially supported against flat thrust plates 32 in the planet carrier 10 and radially guided in the planet carrier 10 under load but centered essentially by the bevel teeth 21, 31. Each central gear 30, 35 is non-rotatably connected via radial splines 33, 43 with an axle shaft 40, 45 and drives, via said axle shaft 40, 45, a drive gear, not shown, on a drive axle of a vehicle.

FIG. 1: The central gear 30 carries, axially opposite the bevel teeth 31, axial clutch teeth 51 and forms therewith an axially stationary half 50 of a clutch 6. An axially movable half 60 of the clutch 6 is non-rotatably situated on the planet carrier 10, over radial splines 13, 63, and likewise carries axial clutch teeth 61.

FIG. 4: Flanks 52, 62 of the clutch teeth 51, 61 of the stationary half 50 and of the movable half 60 are inclined in an axial direction forming a deflection angle 55 in a manner such that torque produces an axial deflection force which will disengage the clutch 6.

FIG. 1: Radial splines 13, 103 and a guard ring 101 firmly hold a retaining ring 100, with an axially stationary retaining surface 4, in the planet carrier 10. The movable half 60 has a bearing surface 64 axially opposite the clutch teeth 61. Radial splines 72, 103 non-rotatably connect a sliding sleeve 70, axially movable toward the movable half 60, with the retaining ring 100 and thus also non-rotatably with the planet carrier 10 and the movable half 60. The sliding sleeve 70, via intermediate members 77 distributed on the periphery, pushes the movable half 60 against the stationary half 50, thus closing the clutch 6 and, with a substantially cylindrical locking surface 74, firmly holds the intermediate members 70 in a locking position between the bearing surface 64 of the movable half 60 and the axially stationary retaining surface 4 of the retaining ring 100.

FIG. 1A, 2, 3A and 5: The bearing surface 64 and the retaining surface 4 form a wedge angle 65 so that the axial deflection force of the clutch teeth 51, 61 produces a radial force which compresses the intermediate members 77 against the locking surface 74 of the sliding sleeve 70. The locking surface 74 of the sliding sleeve 70 is inclined, in an axial direction, forming a small releasing angle 75 so that the radial force of the intermediate members 77 will push the sliding sleeve 70 in the opening direction with a slight axial force.

FIG. 1 and 1A: The housing 1 forms a ring cylinder 80 for a ring piston 81. The seal rings 83, 84 seal the ring piston 81 against the ring cylinder 80. A guard ring 86 defines a hub of the ring piston 81. Pressurized fluid in a chamber 82 between the ring piston 81 and the ring cylinder 80 pushes the ring piston 81 via an axial bearing 90 against the sliding sleeve 70 in order to engage the clutch 6. A spring 71 between the sliding sleeve 70 and the planet carrier 10 pushes back the sliding sleeve 70 and, via the axial bearing 90, the ring piston 81. The deflection force of the clutch teeth 51, 61 then pushes the movable half 60 out of the stationary half 50 and, at the same time, forces the intermediate members 77 radially away from their locking position. Thus the torque essentially disengages the clutch 6 by the deflection force. A spring 68 between the movable half 60 and the thrust plate 32 secured on the planet carrier 10 assists with disengaging the clutch. The spring 68 then retains the movable half 60 removed from the stationary half 50 and thus keeps the clutch 6 disengaged.

FIG. 2 and 2A: The axial shaft 40 is firmly supported axially in the housing 1 by an axial shaft bearing 41. The planet carrier 10 carries axial clutch teeth 51 and thus forms an axially stationary half 50 of the clutch 6. An axially movable half 60 of the clutch 6 is non-rotatably situated over radial splines 42, 63 on the axle shaft 40 and likewise carries axial clutch teeth 61. The axle shaft 40 forms an axially stationary retaining surface 4. The movable half 60 has a bearing surface 64 axially opposite the clutch teeth 61. Radial splines 67, 72 non-rotatably connect a sliding sleeve 70, axially movable toward the movable half 60, with the movable half 60 and thus also non-rotatably with the axle shaft 40 and the central gear 30. The sliding sleeve 70 is axially limitedly movable between two surfaces 7, 8 of the movable half 60.

The sliding sleeve 70 pushes via intermediate members 77 the movable half 60 against the stationary half 50, thus engaging the clutch 6 and then retains the intermediate members 77 firmly between the bearing surface 64 of the movable half 60 and the retaining surface 4 of the axle shaft 40 in a locking position, with a substantially cylindrical locking surface 74.

FIG. 2, 2A, 3 and 3A: Into the housing 1 is passed a shift fork 95. The shift fork 95 presses via a first axial bearing 90 against the sliding sleeve 70 to engage the clutch 6. The shift fork 95 draws back the sliding sleeve 70 via a second axial bearing 91. The deflection force of the clutch teeth 51, 61 then pushes the movable half 60 out of the stationary half 50 and, at the same time, forces the intermediate members 77 radially out of their locking position between the bearing surface 64 and the retaining surface 4. Thus, the torque disengages the clutch 6 essentially by the deflection force. Thereafter, the shift fork 95 removes the movable half 60 from the stationary half 50 and thus disengages the clutch 6 and retains the movable half 60 in the disengaged position, via the second axial bearing 91, the sliding sleeve 70 and a surface 8 of the movable half 60.

Figure 3A:
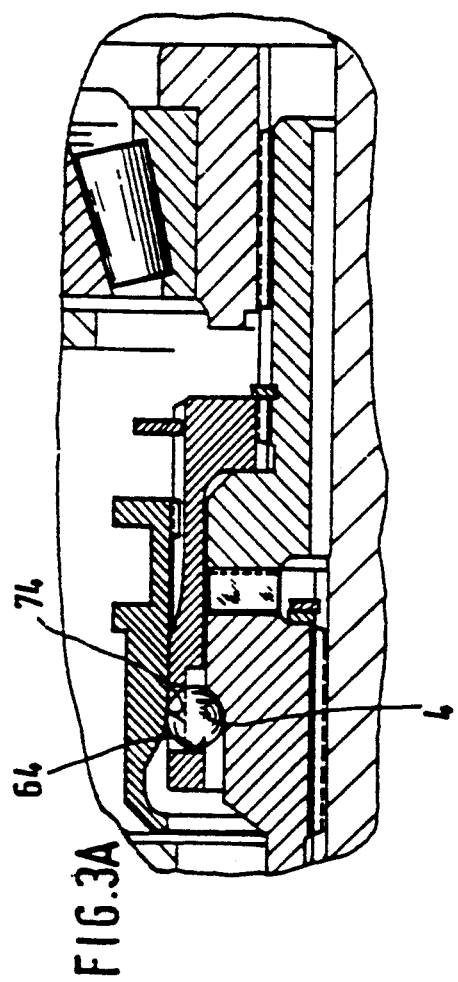

FIG. 3 and 3A: The axle shaft 40 is firmly supported axially in the housing 1 by an axle shaft bearing 41. An axially stationary half 50 of a clutch 6 is firmly connected via radial splines 42, 53 and a guard ring 56 with the axle shaft 40 and thus forms a part of the axle shaft 40. The stationary half 50 as part of the axle shaft 40 carries axial clutch teeth 51. An axially movable half 60 of the clutch 6 is non-rotatably situated in the planet carrier 10 over radial splines 13, 63 and likewise carries axial clutch teeth 61. An extension 105 is firmly connected via splines 63, 107 and a guard ring 106 with a movable half 60 and thus forms a part of the movable half 60. The extension 105 as part of the movable half 60 forms a bearing surface 64 of the movable half 60. The stationary half 50 as part of the axle shaft 40 forms an axially stationary retaining surface 4. Radial splines 72, 108 non-rotatably connect a sliding sleeve 70 axially movable toward the movable half 60 with the extension 105 and thus also non-rotatably with the movable half 60 and the planet carrier 10. The sliding sleeve 70 is axially limitedly movable toward the movable half 60 between two surfaces 7, 8 of the extension 105. The sliding sleeve 70 pushes the movable half 60 against the stationary half 50, via intermediate members 77 passed into the extension 105, thus engaging the clutch 6 and, with a substantially cylindrical locking surface 74, firmly retains the intermediate members 77 in the locking position between the bearing surface 64 of the movable half 60 on the extension 105 and the axially stationary retaining surface 4 of the stationary half 50 on the axle shaft 40.

The shift fork 95 can be a shift fork on a sliding rod wherein either the shift fork can be movable on the sliding rod and the sliding rod secured to the housing 1 or the shift fork can be secured on the sliding rod and the sliding rod is movable in the housing 1. The shift fork 95 can also be a swivel fork supported in the housing 1 which carries, on its fork ends, sliding pads which form two axial bearings with the two surfaces of the sliding sleeve 79.

The axle shaft bearing 41 can be any adequate roller or low-friction bearing.

Instead of a ring cylinder 80 with a ring piston 81, a ring electromagnet with a ring magnet armature can also engage the clutch.

The clutch 6, in general, can be especially used as a locking clutch for differential transmissions of vehicles.

The differential transmission can be a transverse differential transmission for distributing a driving force on at least two drive gears of a driving axle or a longitudinal differential transmission for distributing the driving force on at least two drive axles of a vehicle. The differential transmission can be a bevel gear planetary transmission or a spur gear planetary transmission.

The numbers of teeth of the central gears can be equal or unequal to each other. The differential transmission thus can distribute the driving force evenly or unevenly at a stable ratio.

The external force to move the shift fork can be a manual force or a piston force from a fluid cylinder. The movable half 60 can consist of several parts.

| Reference numerals | |
|---|---|
| 1 | housing |
| 4 | retaining surface |
| 6 | clutch |
| 7 | end face |
| 8 | end face |
| 10 | planet carrier |
| 11 | planet carrier bearing |
| 13 | spline |
| 20 | planet |
| 21 | bevel gear tooth |
| 22 | thrust shell |
| 23 | planet axle |
| 30 | central gear |
| 31 | bevel gear tooth |
| 32 | thrust plate |
| 33 | spline |
| 35 | central gear |
| 40 | axle shaft |
| 41 | axle shaft bearing |
| 42 | spline |
| 43 | spline |
| 45 | axle shaft |
| 50 | stationary half |
| 51 | clutch tooth |
| 52 | flank |
| 53 | spline |
| 55 | deflection angle |
| 56 | guard ring |
| 60 | movable half |
| 61 | clutch tooth |
| 62 | flank |
| 63 | spline |
| 64 | bearing surface |
| 65 | wedge angle |
| 67 | spline |
| 68 | spring |
| 70 | sliding sleeve |
| 71 | spring |
| 72 | spline |
| 74 | locking surface |
| 75 | releasing angle |
| 77 | intermediate member |
| 80 | ring cylinder |
| 81 | ring piston |
| 82 | chamber |
| 83 | seal ring |
| 84 | seal ring |
| 86 | guard ring |
| 90 | axial bearing |
| 91 | axial bearing |
| 95 | shift fork |
| 100 | support ring |
| 101 | guard ring |
| 102 | spline |
| 103 | spline |
| 105 | prolongation |
| 106 | guard ring |
| 107 | spline |
| 108 | spline |

We claim:

1. A clutch, having an axis of operation, comprising:
   an axially stationary half (50) and an axially movable half (60), both said stationary and said movable halves (50, 60) of said clutch (6) carry clutch teeth (51, 61) located to engage one another, and said clutch teeth (51, 61) extending parallel to said axis, each tooth of said clutch teeth having a crest and root spaced apart in a direction parallel to said axis by a pair of flanks (52, 62) inclined to taper that tooth to reduce its width from the root to the crest in a direction parallel to said axis;
   said mavable half (60) having a support face (64);
   an axially stationary support face (4);
   means for moving a sliding sleeve (70) from a first position to a second position in which said sliding sleeve (70) biases, via intermediate members (77) distributed on the periphery thereof, said movable half (60) toward said stationary half (50) to engage said clutch (6) and retaining upon engagement of said clutch, via a substantially axially extending locking face (74) supported by said sliding sleeve, said intermediate members (77) in a locked position located axially between the movable support face (64) of said movable half (60) and the axially stationary support face (4);
   said support face (64) of said movable half (60) and said stationary support face (4) forming a wedge angle which, when said clutch (6) is fully engaged and a torque is produced by said clutch (6), produces a radial force on said intermediate members (77), via an axial rejection force of said clutch teeth (51, 61), which forces each said intermediate members (77) against said locking face (74); and
   upon said means for moving the sliding sleeve (70) allowing said sliding sleeve (70) to return to its first position, said intermediate members (77) being released from the locked position and the produced torque disengaging said clutch (6),
   wherein said sliding sleeve (70) is non-rotatably connected with said movable half (60).

2. A clutch according to claim 1, wherein said locking surface (74) is inclined relative to said axis to form a releasing angle (75) of between 3 degrees and 12 degrees;
   each flank is disposed relative the extension of the associated tooth at a deflection angle (55) of between 12 degrees and 35 degrees; and
   said wedge angle (65) is between 15 degrees and 45 degrees.

3. A clutch according to claim 2, wherein said releasing angle (75) is between 7 degrees and 8 degrees;
   said deflection angle (55) between 15 degrees and 25 degrees; and
   said wedge angle (65) is between 20 degrees and 30 degrees.

4. A clutch, having an axis of operation, comprising:
   an axially stationary half (50) and an axially movable half (60), both said stationary and said movable halves (50, 60) of said clutch (6) carry clutch teeth (51, 61) located to engage one another, sand said clutch teeth (51, 61) extending parallel to said axis, each tooth of said clutch teeth having a crest and root spaced apart in a direction parallel to said axis by a pair of flanks (52, 62) inclined to taper that tooth to reduce its width from the root to the crest in a direction parallel to said axis;
   said movable half (60) having a support face (64);

an axially stationary support face (4);

means for moving a sliding sleeve (70) from a first position to a second position in which said sliding sleeve (70) biases, via intermediate members (77) distributed on the periphery thereof, said movable half (60) toward said stationary half (50) to engage said clutch (6) and retaining upon engagement of said clutch, via a substantially axially extending locking face (74) supported by said sliding sleeve, said intermediate members (77) in a locked position located axially between the movable support face (64) of said movable half (60) and the axially stationary support face (4);

said support face (64) of said movable half (60) and said stationary support face (4) forming a wedge angle which, when said clutch (6) is engaged and a torque is produced by said clutch (6), produces a radial force on said intermediate members (77), via an axial rejection force of said clutch teeth (51, 61), which forces each said intermediate members (77) against said locking face (74); and upon said means for moving the sliding sleeve (70) allowing said sliding sleeve (70) to return to its first position, said intermediate members (77) being released by the locked position and the produced torque disengaging said clutch (6), wherein said sliding sleeve (70) is non-rotatably connected with said movable half (60);

said stationary half (50) carries said stationary support face (4) on an exterior surface thereof;

said movable half (60) includes a moveable extension (105) which carries said support face (64), and said moveable extension (105) cooperates with said sliding sleeve (70) to engage said clutch teeth (51, 61); and said locking surface (74) is an inner surface of said sliding sleeve (70).

5. A clutch, having an axis of operation, comprising:

an axially stationary half (50) and an axially movable half (60), both said stationary and said movable halves (50, 60) of said clutch (6) carry clutch teeth (51, 61) located to engage one another, and said clutch teeth (51, 61) extending parallel to said axis, each tooth of said clutch teeth having a crest and root spaced apart in a direction parallel to said axis by a pair of flanks (52, 62) inclined to taper that tooth to reduce its width from the root to the crest in a direction parallel to said axis;

said movable half (60) having a support face (64);

an axially stationary support face (4);

means for moving a sliding sleeve (70) from a first position to a second position in which said sliding sleeve (70) biases, via intermediate members (77) distributed on the periphery thereof said movable half (60) toward said stationary half (50) to engage said clutch (6) and retaining upon engagement of said clutch, via a substantially axially extending locking face (74) supported by said sliding sleeve, said intermediate members (77) in a locked position located axially between the movable support face (64) of said movable half (60) and the axially stationary support face (4);

said support face (64) of said movable half (60) and said stationary support face (4) forming a wedge angle which, when said clutch (6) is engaged and a torque is produced by said clutch (6), produces a radial force on said intermediate members (77), via an axial rejection force of said clutch teeth (51, 61), which forces each said intermediate members (77) against said locking face (74); and upon said means for moving the sliding sleeve (70) allowing said sliding sleeve (70) to return to its first position, said intermediate members (77) being released from the locked position and the produced torque disengaging said clutch (6), wherein said sliding sleeve (70) is non-rotatably connected with said movable half (60), said clutch is incorporated into a planetary transmission having a planet carrier (10) supporting at least one planet gear (20), and two central gears (30, 35) engaging said at least one planet gear;

said planet carrier drives two separate axle shafts (40, 45) via said planet gear (20) and said central gears (30, 35); and said clutch (6) is positioned to supply driving power from said planet carrier (10) to one of said two axle shafts (40), whereby, when said clutch (6) is engaged, a driving connection is achieved between said one of said two axle shafts (40) and said planet carrier (10).

6. A clutch according to claim 5, wherein said one of said two axle shafts (40) supports said stationary half (50); and said planet carrier (10) drives said movable half (60).

7. A clutch according to claim 5, wherein said planet carrier (10) supports said stationary half (50); and said movable half (60) drives said one of said two axle shafts (40).

8. A clutch according to claim 5, wherein a central gear (30) supports said stationary half (50);

said planet carrier (10) carries said stationary face (4);

said planet carrier (10) drives said movable half (60) and said sliding sleeve (70); and said locking surface (74) is an outer surface of said sliding sleeve (70).

9. A clutch according to claim 5, wherein said planet carrier (10) supports said stationary half (50);

said one of said axle two shafts (40) supports said stationary face (4);

said movable half (60) drives said one of said two axle shafts (40) and said sliding sleeve (70); and said locking surface (74) is an inner surface of said sliding sleeve (70).

* * * * *